April 29, 1924.

J. E. GRANGER

ELECTRODE AND ELECTRODE HOLDER

Original Filed Oct. 10, 1922

1,492,167

Inventor
J. E. Granger
by Donald U. Rich
Attorney

Patented Apr. 29, 1924.

1,492,167

UNITED STATES PATENT OFFICE.

JOSEPH E. GRANGER, OF ALHAMBRA, CALIFORNIA.

ELECTRODE AND ELECTRODE HOLDER.

Original application filed October 10, 1922, Serial No. 593,488. Divided and this application filed September 11, 1923. Serial No. 662,061.

*To all whom it may concern:*

Be it known that I, JOSEPH E. GRANGER, a citizen of the United States, residing at Alhambra, in the county of Los Angeles and State of California, have invented certain new and useful Improvements in Electrodes and Electrode Holders, of which the following is a specification.

This invention relates to electrodes and electrode holders used for electric arc welding and refers more particularly to an electrode and holder therefor which is capable of use with automatic and semi-automatic operating apparatus.

This application is a division of my application Ser. No. 593,488, filed October 10, 1922, electrode and electrode holders for electric arc welding.

With the devices heretofore in use it has been difficult to feed and guide the electrode in a straight line toward the weld and such devices are generally more or less complicated and very inconvenient in use for the reason that the feeding and guiding mechanism is generally positioned directly over or opposite the weld thus enabling the electrode to be brought into a position substantially vertical to the surface of the weld.

It is therefore the primary object of this invention to provide an electrode and electrode holder of such construction that that portion of the electrode which lies adjacent to the arc may be substantially vertical to and directly over the work although the feeding and guiding elements are positioned at one side, thus permitting a clear view of the work by the operator.

Other objects and advantages will be apparent from the following description taken in conjunction with the accompanying drawings in which.

Figures 1, 2:
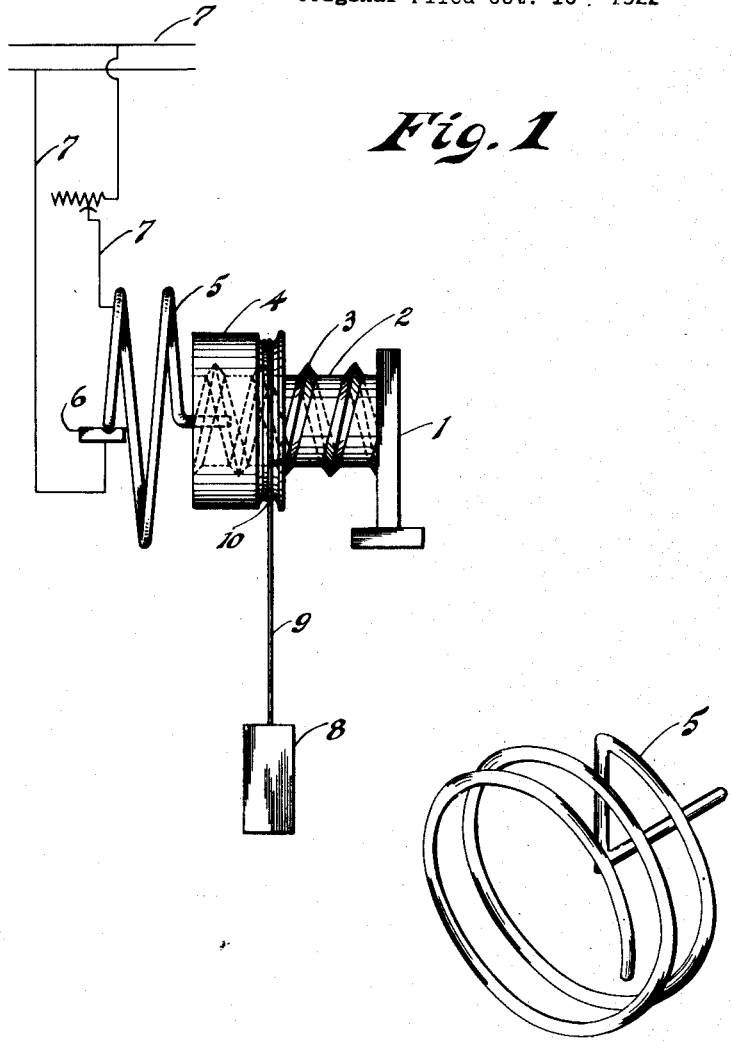
Figure 1 is a side elevation of the invention.
Figure 2 is a perspective view of the electrode.

Referring now more particularly to the drawings the numeral 1 indicates a support which has rigidly mounted thereon, a screw 2 provided with an exterior thread 3. Mounted for longitudinal movement on said screw is a spindle 4 having internal threads adapted to cooperate with the thread 3.

Secured to the spindle 4 in any suitable manner so as to be removable therefrom if desired is the electrode 5.

As can be clearly seen in the drawings the electrode 5 is formed of a plurality of convolutions, thus forming a spiral. By "spiral" I mean an electrode which is of curved form throughout its length and at the place where the arc is formed, in contradistinction to an electrode which is straight as it approaches the arc although it may be wound on a reel or the like before it is straightened to approach the work.

The numeral 6 indicates the work and the numeral 7 indicates suitable electric connections all of which are well known in the art and form no part of the present invention. It is to be understood that the turning of the spindle 4 may be produced by means of a weight 8, attached to a cord 9, which cord is secured to and wrapped around the reduced end 10 of the spindle, or by any other suitable means desired, such means being so constructed as to maintain the end of the electrode and the work in proper spaced relation, but such means not forming the subject matter of the invention, the same are not shown.

As before mentioned, the electrode 5 is arranged coaxially with and is detachably mounted upon the spindle and the pitch of the convolutions of the electrode 5 and that of the thread 3 on the screw 2, correspond so that an even and steady feed of the electrode is produced.

While I have shown and described a feed for moving the electrode toward its work it is perfectly possible however to feed the work toward the electrode while the electrode is being fed or being held stationary, all within the spirit of this invention.

I desire it further understood that in addition to the normal movement of the electrode toward the work it is possible to so mount the support 1 that the electrode may be moved longitudinally or otherwise with its spindle with respect to the work and that the work may be fed in any manner to obtain successful operation of the electrode, all within the spirit of this invention.

Having thus described my invention, what I claim and desire to secure by Letters Patent is:

1. An electrode for electric arc welding formed into the shape of a spiral.

2. Welding apparatus including as an element an electrode resembling a spiral having one end adapted to be placed in juxtaposition to the work and means having a revolving and longitudinal movement around and along the axis of the spiral for feeding said electrode to its work.

3. Welding apparatus comprising a support, a screw secured thereto, a spindle movable longitudinally on said screw and a spiral electrode secured to said spindle, the pitch of the convolutions of the electrode corresponding substantially with the pitch of the thread of the screw.

4. Welding apparatus including as an element a spiral electrode positioned concentrically in alignment with an axis, and adapted to be adjusted at one end in juxtaposition to its work by a turning movement about said axis.

5. Welding apparatus including as an element a spiral electrode positioned concentrically in alignment with an axis, and adapted to be adjusted at one end in juxtaposition to its work by a turning movement of said axis.

6. Welding apparatus including as an element a spiral electrode adapted to be adjusted at one end in juxtaposition to its work and a holder upon which said electrode is mounted, adapted to vertically feed said spiral electrode to its work by a turning movement of the electrode.

In testimony whereof I affix my signature.

JOSEPH E. GRANGER.